US011323860B2

(12) United States Patent
Lofton

(10) Patent No.: US 11,323,860 B2
(45) Date of Patent: May 3, 2022

(54) SYSTEM, METHOD AND APPARATUS FOR COMMUNICATION WITH OCCUPANTS OF A VEHICLE

(71) Applicant: Eddie B. Lofton, Grayson, GA (US)

(72) Inventor: Eddie B. Lofton, Grayson, GA (US)

( * ) Notice: Subject to any disclaimer, the term of this patent is extended or adjusted under 35 U.S.C. 154(b) by 0 days.

(21) Appl. No.: 16/837,734

(22) Filed: Apr. 1, 2020

(65) Prior Publication Data

US 2020/0236522 A1 Jul. 23, 2020

Related U.S. Application Data

(63) Continuation-in-part of application No. 16/291,173, filed on Mar. 4, 2019, now Pat. No. 10,645,552, which is a continuation-in-part of application No. 15/380,602, filed on Dec. 15, 2016, now Pat. No. 10,264,610.

(60) Provisional application No. 62/368,117, filed on Jul. 28, 2016.

(51) Int. Cl.
| | |
|---|---|
| *H04B 3/00* | (2006.01) |
| *H04W 4/46* | (2018.01) |
| *H04W 4/80* | (2018.01) |
| *G08G 1/0967* | (2006.01) |
| *G08G 1/0965* | (2006.01) |
| *H04M 1/60* | (2006.01) |
| *H04W 76/14* | (2018.01) |

(52) U.S. Cl.
CPC ............. *H04W 4/46* (2018.02); *H04W 4/80* (2018.02); *H04W 76/14* (2018.02)

(58) Field of Classification Search
None
See application file for complete search history.

(56) References Cited

U.S. PATENT DOCUMENTS

| | | | |
|---|---|---|---|
| 5,572,201 A * | 11/1996 | Graham | G08G 1/0965 |
| | | | 340/902 |
| 6,052,603 A | 4/2000 | Kinzalow | |
| 6,252,519 B1 * | 6/2001 | McKenna | G08G 1/0965 |
| | | | 340/464 |
| 6,609,055 B2 | 8/2003 | Stanley | |
| 6,804,525 B2 | 10/2004 | Davis | |
| 6,917,801 B2 | 7/2005 | Witte | |
| 7,020,486 B2 * | 3/2006 | Tanada | H04M 1/72513 |
| | | | 455/552.1 |

(Continued)

*Primary Examiner* — Tuan A Tran
(74) *Attorney, Agent, or Firm* — Larson & Larson, P.A.; Frank Liebenow; Justin P. Miller

(57) ABSTRACT

A method of communicating between a person within a target vehicle and a law-enforcement person includes establishing a connection between a law-enforcement transceiver and a target vehicle transceiver using a protocol and encoding an audio signal into an encoded audio signal by the law-enforcement transceiver using the protocol, The encoded audio signal is transmitted from the law-enforcement transceiver and received by the target vehicle transceiver where the encoded audio signal is accepted by the target vehicle transceiver through a feature in the protocol, the feature in the protocol allowing limited access to an audio transducer of the target vehicle, the encoded audio signal is decoded back into the audio signal by the target vehicle transducer and the audio signal is reproduced on the audio transducer within the target vehicle.

16 Claims, 7 Drawing Sheets

(56) References Cited

U.S. PATENT DOCUMENTS

| | | | |
|---|---|---|---|
| 7,133,767 B2* | 11/2006 | Ogino | G01C 21/26 |
| | | | 701/400 |
| 7,353,088 B2 | 4/2008 | Eagen et al. | |
| 7,376,137 B2 | 5/2008 | Sung et al. | |
| 7,619,622 B2 | 11/2009 | Souza et al. | |
| 7,751,945 B2* | 7/2010 | Obata | G08G 1/161 |
| | | | 340/902 |
| 8,200,158 B2 | 6/2012 | Lofton | |
| 8,401,477 B2 | 3/2013 | Lofton | |
| 8,532,575 B2 | 9/2013 | Lofton | |
| 8,682,004 B2* | 3/2014 | Grigsby | G08G 1/0962 |
| | | | 340/435 |
| 8,872,563 B2 | 10/2014 | Lofton | |
| 8,939,839 B2* | 1/2015 | Cash | H04L 67/38 |
| | | | 463/40 |
| 10,264,610 B2 | 4/2019 | Lofton | |
| 2002/0055343 A1 | 5/2002 | Stetzler et al. | |
| 2002/0140215 A1 | 10/2002 | Breed et al. | |
| 2003/0016636 A1 | 1/2003 | Tari et al. | |
| 2003/0136600 A1 | 7/2003 | Breed et al. | |
| 2004/0058649 A1 | 3/2004 | Grady | |
| 2006/0003737 A1* | 1/2006 | Alrabady | H04L 63/0428 |
| | | | 455/410 |
| 2007/0112476 A1 | 5/2007 | Obradovich | |
| 2008/0140868 A1 | 6/2008 | Kalayjain et al. | |

* cited by examiner

SYSTEM, METHOD AND APPARATUS FOR COMMUNICATION WITH OCCUPANTS OF A VEHICLE

CROSS-REFERENCE TO RELATED APPLICATION

This application is a continuation-in-part of U.S. patent application Ser. No. 16/291,173, filed Mar. 4, 2019 which is a continuation-in-part of U.S. patent application Ser. No. 15/380,602, filed Dec. 15, 2016, now U.S. Pat. No. 10,264,610 issued Apr. 16, 2019, which in turn is a non-provisional application claiming benefit of U.S. patent application Ser. No. 62/368,117, filed Jul. 28, 2016, the disclosure of which is hereby incorporated by reference.

FIELD OF THE INVENTION

This invention relates to the field of communications and more particularly to a system for communicating with an occupant of a vehicle.

BACKGROUND

There are many needs for communicating with an occupant of a vehicle, car, bus, truck, etc. Examples of such are to initiate a transaction at a drive through, answering questions at a roadblock or checkpoint, during a traffic stop, etc. Currently, to perform such communications requires that an occupant of the vehicle open a window or door and communicate through that open window or door.

In recent times, due to extremely contagious diseases, it has been advised for people to maintain certain distances to reduce the spread of such diseases (e.g. the flu, Covid-19). This has led to issues when emergency personnel or law-enforcement personnel is required to speak to those within a vehicle. The days where the officer walks up to the vehicle and the occupant hands the officer his/her license and registration may be gone, as such an act could be fatal to the officer and/or the occupant. Likewise, as in-store purchasing is reduced and more people are picking up food, pharmaceuticals, etc., at a drive-through window, better distancing and higher efficiencies are needed for the drive-through process.

An example of such communication occurs when one places an order at an order taking position of a fast food restaurant. In such, the occupant must roll down their window (or open their door) and verbally communicate with a speaker and microphone located at the order taking position. By opening the window, the occupant is exposed, not only to the weather, but to a potential of theft, bodily injury, infection from the prior vehicle, or carjacking. Meanwhile, the person taking the order is safe, dry and warm inside the fast food restaurant until payment is made. To further compound the difficulty in communication, often the speaker is of inadequate quality to clearly hear the order taker and the background noise coupled with microphone quality and position makes it difficult for the order taker to hear and understand the occupant of the vehicle.

In certain climates, weather makes it uncomfortable and inconvenient for the occupant to open their window. In some location, cold weather includes temperatures well below zero, wind, rain, hail, snow, blowing snow, blowing sand and dust, etc. It is often uncomfortable to open a window in such climates, especially when young children are also situated in the vehicle. Many potential customers of establishments with drive-thru facilities are dissuaded from frequenting such establishments during bad weather.

In certain neighborhoods, it is dangerous to open a vehicle window for fear that a criminal will reach in the vehicle, cause bodily injury, grab something of value, coerce the occupant into getting out, etc. Many potential customers of establishments with drive-thru facilities are dissuaded from frequenting such establishments due to fear of lost valuables and/or bodily harm.

In certain law-enforcement situations it becomes necessary for a law officer, border guard, sentry, etc, to communicate with a vehicle occupant. For example, when a law officer makes a traffic stop, the officer must communicate with the driver to inform them of what they did wrong (speeding), get their name, license number, insurance company, etc. Similarly, at a checkpoint such as at a roadblock, border, etc, it is sometimes needed to ask questions of the vehicle occupants. The above noted or similar environmental, weather, and safety issues are present in these situations. In addition, there is a risk of transmitting infectious diseases to the law-enforcement officer. For example, when a law-enforcement officer makes a traffic stop, infectious diseases may be transmitted in the air or on materials such as driver's licenses between the officer and an occupant of the vehicle. Often, the officer must get out of their vehicle to retrieve the driver's information, return to their vehicle to access their computer system and issue the summons, then exit their vehicle to present the summons to the driver. This exposes the officer to infectious diseases as well as to the elements and increases the risk of the officer being hit by a passing vehicle, especially in bad weather such as fog or when roads are slippery. Furthermore, the initial confrontation with the driver is a dangerous situation for the officer. Further, if the individual is wanted for something serious, has a gun, or is otherwise dangerous, the initial confrontation often becomes a life threatening situation for the officer.

There are existing ways to perform such communications, none of which are practical. For example, a cellular phone can be used to establish a voice call with the occupant. This is not practical for several reasons: not everybody has a cell phone, cell phone calls often result in costs to the owner of the cell phone, and there is no established protocol for conveying an occupant's or driver's phone number to a law-enforcement officer.

Another way to perform such communications is with a short-range wireless communication device such as a walkie-talkie. This solution would work if everybody had such a device and there were sufficient channels and security.

There are known one-way methods of communicating on-way to an occupant of vehicle. For years, it has been known to locally transmit audio to occupants of vehicles through the ubiquitous AM/FM radio present in almost every vehicle. This has been done to warn drivers of weather and traffic issues, to guide and inform drivers in theme parks, to describe attractions as the occupants drive through (e.g., animal parks), etc. This has long been used as an inward way to communicate in one direction, but this mechanism has no provision for the vehicle occupant(s) to communicate outwardly.

Many newer vehicles are equipped with an audio system that has local data communications such as Wi-Fi (IEEE 802.11) or Bluetooth (IEEE 802.15), for example for communicating with a device located within the vehicle to provide hands-free capabilities for phone calls through a cellular device. Such capabilities currently work within the vehicle, but do not communicate with devices outside of the vehicle, for example, with a law-enforcement vehicle.

What is needed is a system that will enable two-way communication without requiring opening and/or approaching the vehicle.

SUMMARY

A two-way communication system for communicating with a person who is within a target vehicle is disclosed. Communication to the person is done by way of a short-range radio transmission with a transceiver (e.g., Bluetooth or Wi-Fi) within the vehicle. After paring or authentication, voice communication from the occupant(s) of the target vehicle are detected by a microphone in the target vehicle and transmitted out of the target vehicle on radio waves according to a protocol (e.g., Bluetooth or Wi-Fi). Voice communications from outside the target vehicle (e.g., from a law-enforcement vehicle) are received and encoded and transmitted to the target vehicle on radio waves according to such protocols (e.g. Bluetooth or Wi-Fi) and reproduced on an audio transducer (e.g., speaker) within the target vehicle.

In one embodiment, an apparatus for communicating with an occupant of a target vehicle is disclosed including a stand-alone device within the target vehicle that houses a first transceiver and a transmitter. A first microphone is electrically coupled to the first transceiver and the first transceiver receives electrical signals from the first microphone representing audio waves from within the target vehicle. The first transceiver is configured to communicate with an external transceiver over a protocol and the transmitter is configured to modulate and transmit a received audio signal to a radio within the target vehicle. The external transceiver has a second microphone and an audio transducer. The external transceiver attempts to establish a point-to-point connection between the first transceiver and the external transceiver and if the first transceiver is instructed to accept the point-to-point connection, the external transceiver establishes the point-to-point connection with the first transceiver and the audio waves from within the target vehicle are encoded and transmitted from the first transceiver to the external transceiver where the external transceiver decodes the audio waves and emits decoded audio waves using the audio transducer. Second audio waves from the second microphone are encoded by the external transceiver and sent to the first transceiver where the first transceiver decodes the second audio waves and the first transceiver provides the second audio waves to the transmitter and the transmitter modulates and transmits the second audio waves to the radio within the target vehicle where the second audio waves are demodulated and reproduced by an second audio transducer for hearing within the target vehicle.

In another embodiment, a method of communicating with a person within a target vehicle is disclosed. The method includes using a protocol to establish a point-to-point connection between an external transceiver and a transceiver within a stand-alone device situated in the target vehicle. After receiving an approval for communications, the transceiver within the communication device of the stand-alone device encoding an audio signal from a microphone interfaced to the stand-alone device into an encoded audio signal and sending the encoded audio signal to the external transceiver using the protocol. Also after receiving the approval for voice communications, the external transceiver encoding a second audio signal from a second microphone that is electrically interfaced to the external transceiver into a second encoded audio signal and the external transceiver sending the second encoded audio signal to the transceiver within the communication device of the stand-alone device uses the protocol. The encoded audio signal is received by the external transceiver and decoded back into the audio signal by the external transceiver and then converted into sound waves by an audio transducer that is electrically interfaced to the external transceiver. The second encoded audio signal is received by the transceiver within the communication device of the stand-alone device and decoded into the second audio signal.

In another embodiment, an apparatus for law-enforcement communications is disclosed having a stand-alone device within a target vehicle that houses a first transceiver and a transmitter. A first microphone is electrically coupled to the first transceiver and the first transceiver receives electrical signals from the first microphone representing audio waves from within the target vehicle. The first transceiver is configured to communicate with an external transceiver over a protocol and the external transceiver interfaced to a law-enforcement vehicle. The transmitter is configured to modulate and transmit a received audio signal to a radio within the target vehicle. The external transceiver has a second microphone and an audio transducer. The external transceiver attempts to establish a point-to-point connection between the first transceiver and the external transceiver and if the first transceiver is instructed to accept the point-to-point connection, the external transceiver establishes the point-to-point connection with the first transceiver and the audio waves from within the target vehicle are encoded and transmitted from the first transceiver to the external transceiver where the external transceiver decodes the audio waves and emits decoded audio waves using the audio transducer. Second audio waves from the second microphone are encoded by the external transceiver and sent to the first transceiver where the first transceiver decodes the second audio waves and the first transceiver provides the second audio waves to the transmitter. The transmitter modulates and transmits the second audio waves to the radio within the target vehicle where the second audio waves are demodulated and reproduced by a second audio transducer for hearing within the target vehicle.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
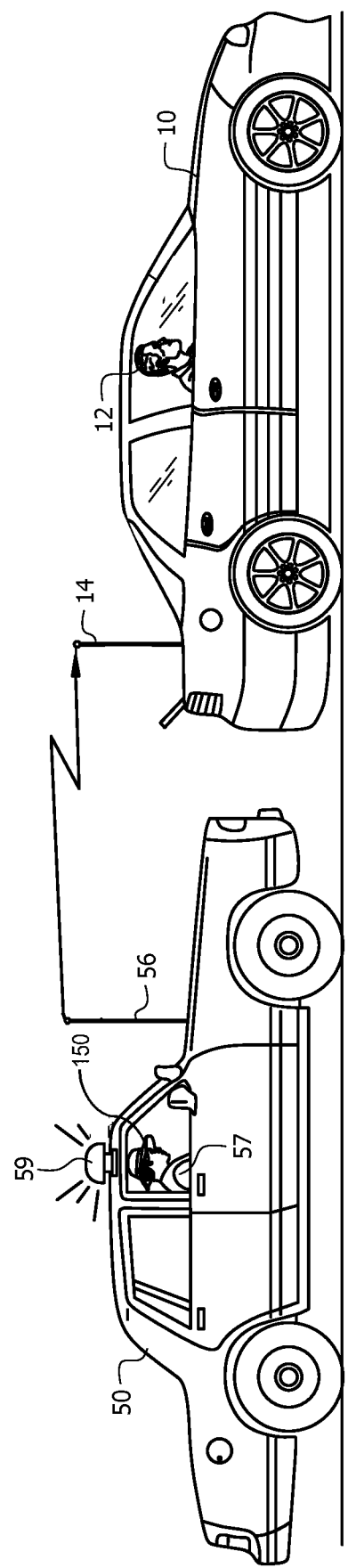
FIG. 1 illustrates a plan view illustrating a system for communicating between a law-enforcement person and an occupant of a vehicle.

Reference will now be made in detail to the presently preferred embodiments of the invention, examples of which are illustrated in the accompanying drawings. Throughout the following detailed description, the same reference numerals refer to the same elements in all figures.

Note that throughout the description, existing local area communications protocols (Bluetooth and Wi-Fi) are used as examples of currently available technology, but it is fully anticipated that as standards evolve; such standards will be adapted for use with the described system.

Referring to FIG. 1, a perspective view of a system for communicating with an occupant of a vehicle will be described. A high-quality, two-way audio communications system between a first entity such as vehicle (e.g. a car, boat, etc.—any target vehicle 10) and second entity such as a law-enforcement vehicle 50 (as shown), a military checkpoint, an entry station for a protected facility (e.g. guard station), etc. In the example shown in FIG. 1, a law-enforcement vehicle 50 is shown as an example of such. In this example, the target vehicle 10 is the subject of a traffic stop by law-enforcement personnel 57 within the law-enforcement vehicle 50. Prior to the present invention, the law-enforcement personnel 57 had to exit their law-enforcement vehicle 50 and approach the target vehicle 10 in order to obtain information from the driver 12 (e.g., license, registration, and proof of insurance). Not only is this inconvenient in bad weather, but this has proven dangerous in many situations due to criminal activity within the target vehicle 10 as well as dangers from other motorists, especially on high-speed roads and during weather that impairs visibility and vehicle control such as snow and fog.

Although in some embodiments, the present invention provides communications between vehicles 10/50 that are not moving (e.g. registering zero on a speedometer), in other embodiments, the present invention provides communications between vehicles 10/50 that are moving, and in such, it is anticipated that there is a specific speed threshold, limit, or range of speeds at which communications are provided. For example, communications are allowed at speeds less than ten miles per hour or at speeds greater than 70 miles per hour (e.g., so speeders can be requested to slow down and pull over).

To provide the communications between the occupants of the target vehicle 10 with the occupant of the law-enforcement vehicle 50, the audio system of the target vehicle 10 is modified as will be describe so as to communicate with the communication system of the law-enforcement vehicle 50. With such, the law-enforcement personnel 57 speaks into a microphone 80 (see FIGS. 3-5) and his or her voice is detected by the microphone 80 and the voice is encoded and transmitted by an external transceiver 82 (e.g., a transceiver external to the target vehicle, for example within a law-enforcement vehicle 50) over a radio frequency signal according to a protocol such as Bluetooth or Wi-Fi (e.g., 802.15, 802.11). The signal is transmitted between an antenna 56 associated with the law-enforcement vehicle 50 to an antenna 14 associated with the target vehicle 10. A transceiver 190 within the target vehicle 10 (see FIGS. 3-5) receives the signal and the transceiver 190 decodes the signal and reproduces the officer's voice on a transducer 24 (e.g. speaker, earbud) within the target vehicle 10. When the occupant(s), e.g. driver 12 of the target vehicle 10 speaks, their voices are detected by a microphone 22 within the target vehicle 10. The microphone 22 is coupled to the audio system 20 within the target vehicle 10 and the voice signal is processed by the transceiver 190 (e.g., Bluetooth or Wi-Fi transceiver) within the target vehicle 10. The transceiver 190 encodes the voice into the protocol and sends the encoded signal (e.g. modulated according to the protocol such as Bluetooth or Wi-Fi) to the external transceiver 82 of the law-enforcement vehicle 50 where the modulated signal is decoded and reproduced as audio at an audio transducer 84 (e.g., speaker, earbud) within the law-enforcement vehicle 50. In some embodiments, the law-enforcement personnel 57 wears a portable transceiver device 150 that is linked to the external transceiver 82 providing hands-free communication while the law-enforcement personnel 57 is within the law-enforcement vehicle 50 and/or after the law-enforcement personnel 57 exits the law-enforcement vehicle 50 to approach the target vehicle 10. In this way, the law-enforcement personnel 57 hear whatever is being said within the target vehicle 10 while approaching. Note that in many of the examples shown, the disclosed system communicates between a law-enforcement vehicle 50 and a target vehicle 10, hence the transceiver within the law-enforcement vehicle 50 is sometimes referred to as the external transceiver 82. This does not limit the location of such transceiver. As will be discussed, it is anticipated that the "external transceiver 82" be situated in business establishments, toll booths, theme park entrances, etc.

It is anticipated that some privacy issues may result in the use of such systems and such issues, if they occur, need to be dealt with through legislation or other means. For example, it is anticipated that a law be passed to permit an law-enforcement personnel 57 to begin reception of audio from the occupant(s), e.g., driver 12 of the target vehicle 10 as soon as they turn on their emergency lights 59 and/or siren (not shown). Likewise, it is anticipated that any such communications between the law-enforcement vehicle 50 and the target vehicle 10 be private and protected from ease dropping by inadvertent listeners through data encryption standards of the selected communications protocols (e.g. Bluetooth or Wi-Fi).

It is also anticipated that, in some embodiments, the driver 12 of the target vehicle 10 needs to agree to the voice communications with the law-enforcement personnel 57 by, for example, by accepting a pairing request (Bluetooth) or other features for accepting the incoming communications based upon the protocol used between the transceivers 82/190.

Figure 2:
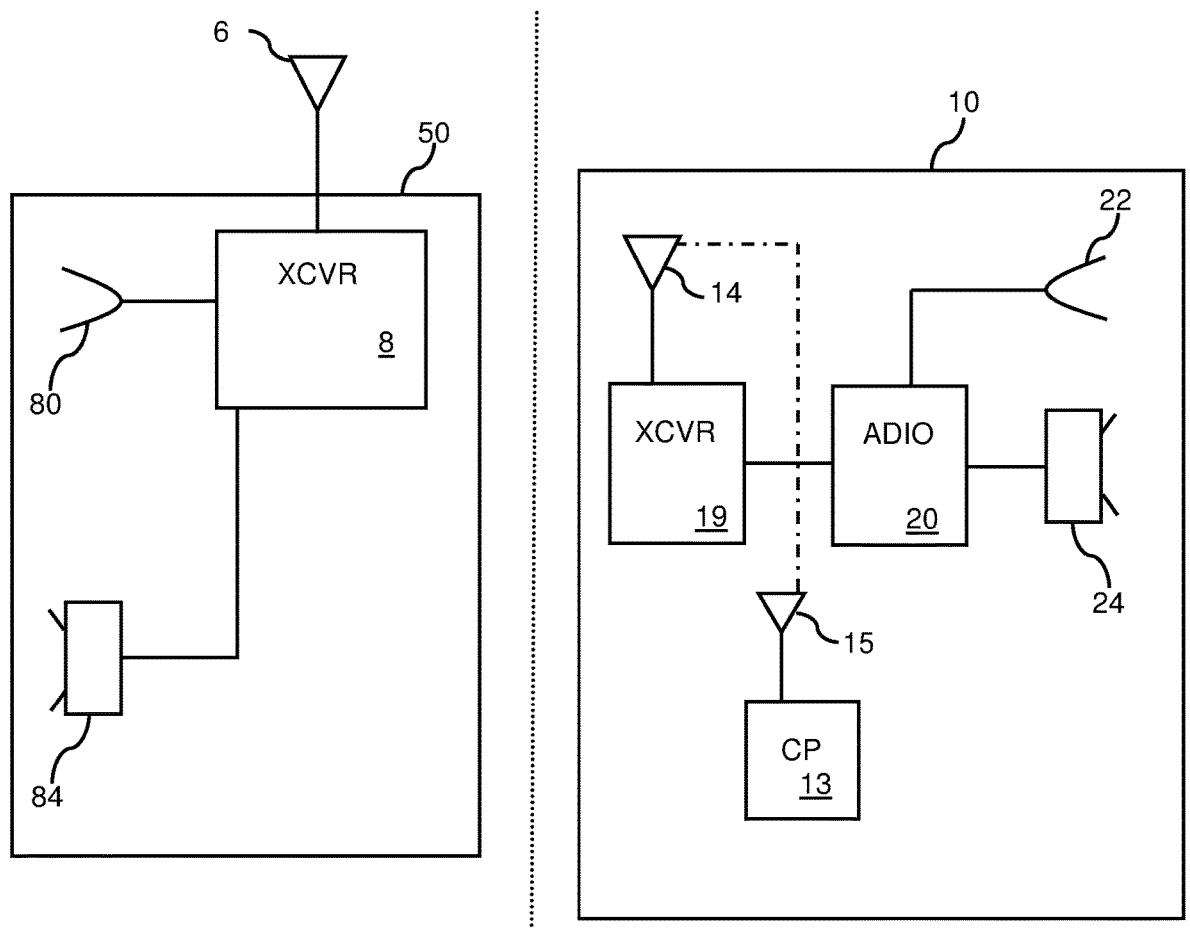
FIG. 2 illustrates a schematic view of the prior art.

Referring to FIG. 2, a schematic view of a system of the prior art will be described. In this example, the target vehicle 10 is equipped with an audio system 20 having a microphone 22 and transducer 24 (e.g., speaker, earbuds, headphone) within the target vehicle 10. This is a standard configuration on many newer model vehicles and is typically used to provide hands-free cellular calling (e.g., speakerphone mode) or to link to music players, etc.

To provide the hands-free operation, a transceiver 19 (e.g., Bluetooth and/or Wi-Fi) is integrated/coupled to the audio system 20. In existing vehicles, such transceivers 19 are typically used to communicate with consumer electronic devices 13 located within the target vehicle 10, in particular with cellular phones or media players within the target vehicle 10. In existing vehicles, such internal data communications are provided for playing music from the consumer electronic device 13, providing hands-free phone calls from the consumer electronic devices 13, etc. In existing protocols, before communications is established between the transceiver 19 and the consumer electronic device 13 (e.g., through antennae 14/15), the transceiver 19 and/or the consumer electronic device 13 must be configured to enable such communications. This enablement is required so that unauthorized devices cannot be easily connected to the transceiver 19 or the consumer electronic device 13. In the example of Bluetooth, the consumer electronic device 13 is paired with the transceiver 19, as known in the industry, typically by instructing both the transceiver 19 to accept and consumer electronic device 13 to initiate a discovery protocol. Once paired, the transceiver 19 typically remembers the consumer electronic device 13 for future communications. In the example of Wi-Fi, the transceiver 19 has encryption credentials and, matching encryption credentials must be entered into the consumer electronic device 13. Without such encryption credentials (or keys), communications is prohibited. This is similar to adding a consumer electronic device 13 to a home wireless network.

Within the law-enforcement vehicle 50 of the prior art, a microphone 80 and audio transducer 84 (e.g., speaker, earbuds, headphone) is typically connected to a transceiver 8. The transceiver is typically for wide-area communications with dispatchers, etc., modulating voice and data communications and sending/receiving such through an antenna 6. The transceiver 8 does not encodes the audio signal from the microphone 80 into a transmission protocol (e.g., Bluetooth or Wi-Fi), compatible with the existing transceiver 19 (coupled to the audio system 20) of the target vehicle 10 and, therefore, the existing transceiver does not communicate with the transceiver 8, having no way to pair and/or lack of proper encryption credentials and, therefore, the transceiver 19 of the target vehicle 10 does not communicate with the transceiver 8 of the law-enforcement vehicle 50.

Figure 3:
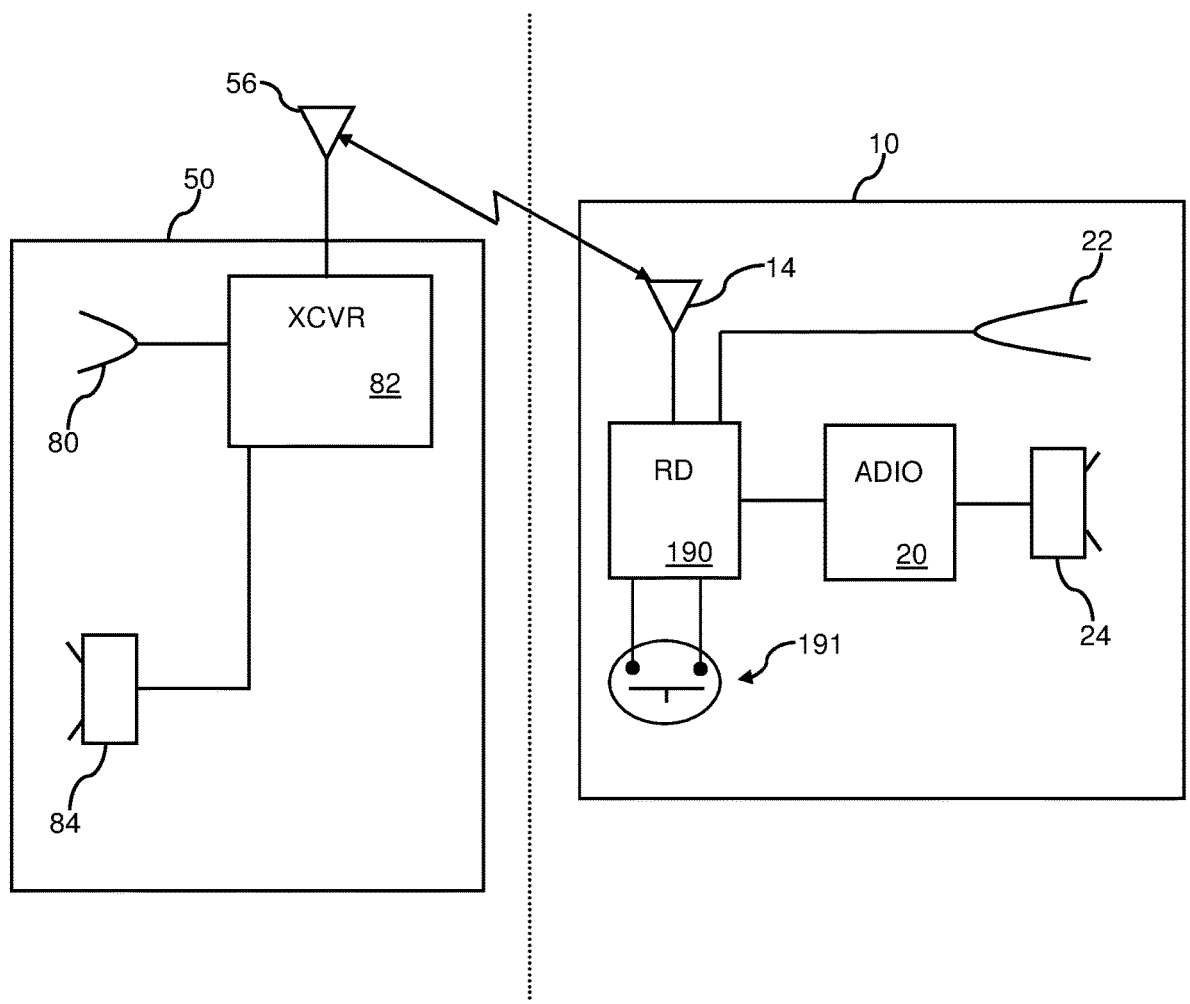
FIG. 3 illustrates a schematic view of a system for communicating with an occupant of a vehicle.

Referring to FIG. 3, a schematic view of a system for communicating with a driver 12 (or occupant) of a target vehicle 10 will be described. Within the law-enforcement vehicle 50 of this example, a microphone 80 and audio transducer 84 (e.g., speaker, earbuds, headphone) are connected to an external transceiver 82. The external transceiver 82 encodes the audio signal from the microphone 80 into the transmission protocol (e.g., Bluetooth or Wi-Fi) and emits the encoded signal from an antenna 56. For listening to the driver 12 of the target vehicle 10, the external transceiver 82 receives and decodes audio signals according to the transmission protocol on the antenna 56 and reproduces the audio, for example, emitting the audio at an audio transducer 84 (e.g., speaker, earbuds, headphone).

It is anticipated that due to limitations of the transceiver 190 within the target vehicle 10 and certain protocol requirements and/or standards, the external transceiver 82 will have higher transmission power output in order to reach the transceiver 190 within the target vehicle and/or greater receiver sensitivity since the transceiver 190 within the target vehicle 10 typically transmits/receives at very lower power levels (e.g. for communicating with devices within the target vehicle 10). In embodiments in which the protocol includes Bluetooth (802.15), the higher transmission power output is anticipated to be above the maximum power output allowance of a specification for Bluetooth (802.15) for penetration into the target vehicle.

In the embodiment of FIG. 3, the audio system 20/190 of the target vehicle 10 is modified as will be describe so as to communicate with the external transceiver 82 of the law-enforcement vehicle 50. When the law-enforcement personnel 57 speak into a microphone 80, his or her voice is detected by a microphone 80 and encoded/transmitted by the external transceiver 82. The signal is transmitted between an antenna 56 associated with the law-enforcement vehicle 50 to an antenna 14 associated with the target vehicle 10 over a radio frequency signal according to a specific protocol such as Bluetooth or Wi-Fi (e.g., 802.11). The transceiver 190 within the target vehicle 10 understands the protocol transmitted by the external transceiver 82, received, decodes, and reproduces the officer's voice on a transducer 24 (e.g., speaker, earbuds, headphone) within the target vehicle 10.

When the occupant(s), e.g. driver 12 of the target vehicle 10 speaks, their voice is detected by a microphone 22 within the target vehicle 10. The microphone 22 is coupled to the transceiver 190 (e.g., Bluetooth or Wi-Fi radio) within the target vehicle 10. The transceiver 190 encodes/modulates the voice signal from the occupant of the target vehicle 10 according to the protocol (e.g., Bluetooth or Wi-Fi) which is transmitted to the external transceiver 82 of the law-enforcement vehicle 50 where the signal is decoded, demodulated, and reproduced as audio at an audio transducer 84 (e.g., speaker, earbuds, headphone) within the law-enforcement vehicle 50. In this way, the law-enforcement personnel 57 hear whatever is being said within the target vehicle 10.

The transceiver 190 in the target vehicle 10 is similar to the existing transceiver 19 of the prior art, optionally including specific modifications to the protocols (e.g., Bluetooth and/or Wi-Fi) and/or pairing/encryption mechanisms to provide limited connections to an external device (e.g. external transceiver 82) without the need to pair the transceiver 190 with the external device (e.g. external transceiver 82) or to provide security credentials from the external device (e.g. external transceiver 82). The limited capabilities provide for reproduction of an encoded audio signal received from an external device (e.g. external transceiver 82) and/or transmission of voices to/from within the target vehicle 10 to an external device (e.g. external transceiver 82). In some embodiments, a secret key is provided to/by the external transceiver 82 that enables limited communications with the transceiver 190 within the target vehicle 10.

In some embodiments, the external transceiver 82 requests a connection with the transceiver 190 within the target vehicle 10 and a message is displayed on the audio system 20 of the target vehicle (or an audio message is played and emitted from the transducer 24). The message requests that the driver 12 (or occupant, operator, etc.) of the target vehicle 10 agree to communicate with the law-enforcement personnel 57. In some embodiments, approval is made by the driver 12 making a verbal statement of agreement (e.g., saying "yes") while in some embodiments, approval is made by pressing an optional button 191 that indicates approval. As voice recognition is available in many vehicle audio systems 20, it is anticipated that in some embodiments, the verbal agreement is received from the microphone 22 and recognized by the transceiver 190

After approval by the driver 12 of the target vehicle 10, limited communications between the transceiver 190 within the target vehicle 10 and the external transceiver 82 of the law-enforcement vehicle 50 is established. An example of such approval is for the driver 12 to press a button 191 on the transceiver 190 of the transceiver 190 or audio system 20 within the target vehicle 10, press the volume-up button on the steering wheel of the target vehicle 10, or speak an agreement word.

It is fully anticipated that, for some embodiments, these limited "back-door" capabilities are provided requiring specific law-enforcement credentials, limiting access by non-law-enforcement people. For example, the external transceiver 82 has secret credentials that enable communication over the desired protocol (e.g. Bluetooth or Wi-Fi) to all transceivers 190 of all target vehicles 10. The secret credentials are provided by the external transceiver 82 in the law-enforcement vehicle 50 to the transceiver 190 in the target vehicle 10. Once the secret credentials are discovered, for example by hackers, they are difficult to change. The consequence is that such hackers will only have the ability to access the audio capabilities of the target vehicle 10. It is anticipated that through legislation it be made illegal for non-law-enforcement people to use such secret credentials, just as it is illegal to use certain police and military radio frequencies for civilian uses, etc.

In some embodiments, for various consumer rights reasons, it is fully anticipated that the transceiver 190 within the target vehicle 10 includes software that detects communications from the external transceiver 82 and, before accepting a point-to-point connection with the external transceiver 82, requires the driver 12 of the target vehicle 10 to take an action such as pressing an accept button 191, providing a voice approval by saying a word (e.g., "yes") to accept the point-to-point connection, etc.

Although the examples shown have an external transceiver 82 within a law-enforcement vehicle 50, it is fully anticipated that the external transceiver 82 (and hence, the microphone 80 and audio transducer 84), be embodied with other devices such as integrated into a hand-held portable device (e.g. worn on the body of the law-enforcement personnel 57), within a guard house, within a restaurant or pharmacy, in other types of vehicles such as helicopters, boats, motorcycles, etc. Likewise, the transceiver 190 of the target vehicle 10 is anticipated to be within any type of target vehicle 10, including, but not limited to marine vehicles, aircraft, golf carts, etc. Likewise, it is anticipated that the transceiver 190 of the target vehicle 10 is integrated with other electronics of the target vehicle 10.

Figure 4:
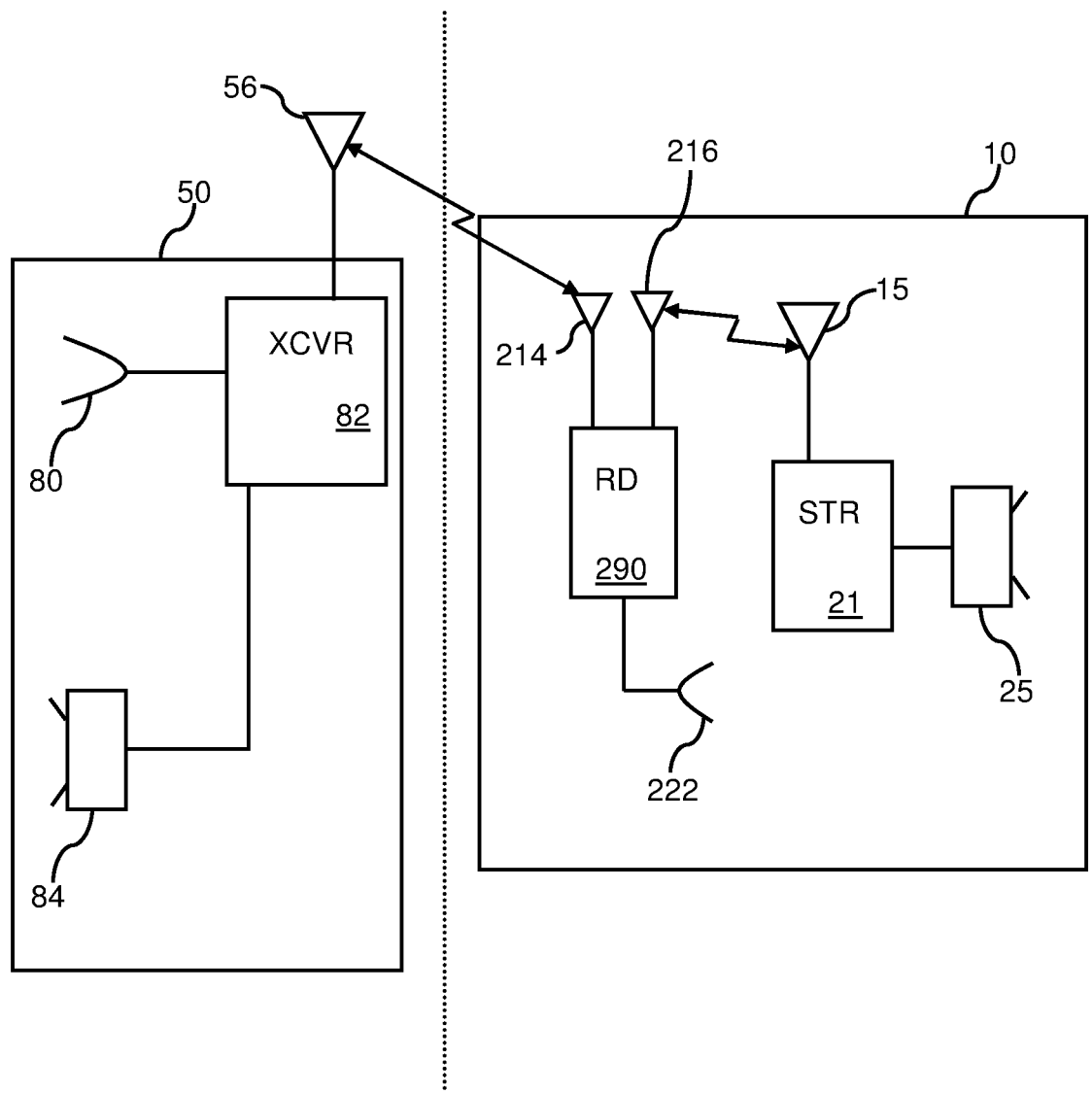
FIG. 4 illustrates a schematic view of the system for communicating with an occupant of a vehicle.

Referring to FIG. 4, a schematic view of the system for communicating with a driver 12 of a target vehicle 10 will be described. For many older-model vehicles, there are no wireless data communication facilities such as Bluetooth and Wi-Fi. For such vehicles, an communications adapter 290 is provided for installation within the target vehicle 10. The communications adapter 290 communicates over the protocol with the external transceiver 82 and communicates with an existing radio 21 (e.g. AM, FM, AM/FM radio) within the target vehicle 10. In some embodiments, the communications adapter 290 includes an audio transducer (e.g. similar to the audio transducer 25 of FIG. 4) and does not need to transmit the audio signal to the existing radio 21.

The law-enforcement vehicle 50 (or other facility) of this example includes a microphone 80 and audio transducer 84 (e.g., speaker, earbuds, headphone) that are connected to an external transceiver 82 (e.g. external to the target vehicle 10). The external transceiver 82 encodes the audio signal from the microphone 80 into the transmission protocol (e.g., Bluetooth or Wi-Fi) and emits the encoded signal from an antenna 56. When the law-enforcement personnel 57 or other person speaks into a microphone 80, his or her voice is detected by a microphone 80, is encoded and transmitted from the external transceiver 82 of the law-enforcement vehicle 50. The signal is transmitted between an antenna 56 associated with the law-enforcement vehicle 50 to an antenna 214 of the communications adapter 290 over a radio frequency signal according to a specific protocol such as Bluetooth or Wi-Fi (e.g., 802.11). The communications adapter 290 is a transceiver that understands the protocol transmitted by the external transceiver 82, and, receives and decodes the officer's voice.

The communications adapter 290 receives the signal encoded with audio from the external transceiver 82 on a first antenna 214 and decodes the audio signal from the signal encoded with audio. Although it is anticipated that the communications adapter 290 include its own speaker, in some embodiments, the communications adapter 290 modulates the decoded audio signal onto a radio-band using amplitude modulation or frequency modulation (e.g., AM or FM) and emits the modulated audio signal on a second antenna 216. An existing radio 21 within the target vehicle 10 receives the modulated audio signal on an antenna 15, demodulates and amplifies the audio signal and emits the audio signal from an audio transducer 25 (e.g., speaker, earbuds, headphone). Note, it is anticipated that the existing radio 21 is any AM, FM, AM/FM radio either originally installed into the target vehicle 10, after-market installed in to the target vehicle 10, or is a hand-held portable AM, FM, or AM/FM radio, with or without additional features such as a CD player, etc.

When the occupant(s), e.g. driver 12 of the target vehicle 10 speaks, their voice is detected by a microphone 222 of the communications adapter 290. The microphone 222 is coupled to the communications adapter 290 and the communications adapter 290 encodes/modulates the voice signal from the occupant of the target vehicle 10 according to the protocol (e.g., Bluetooth or Wi-Fi) and transmits the encoded signal to the external transceiver 82 where the signal is decoded, demodulated, and reproduced as audio at an audio transducer 84 (e.g., speaker, earbuds, headphone), for example, within the law-enforcement vehicle 50. In this example, the law-enforcement personnel 57 hear whatever is being said within the target vehicle 10.

The communications adapter 290 includes specific modifications, if needed, to the protocols (e.g., Bluetooth and/or Wi-Fi) and/or pairing/encryption mechanisms to provide limited connections to an external device (e.g. external transceiver 82) without the need to explicitly pair the communications adapter 290 with the external device (e.g. external transceiver 82) or to provide security credentials from the external device (e.g. external transceiver 82). The limited capabilities provide for reproduction of an encoded audio signal received from an external device (e.g. external transceiver 82) and/or transmission of voices to/from within the target vehicle 10 to an external device (e.g. external transceiver 82). In some embodiments, a secret key is provided to the external transceiver 82 that enables limited communications with the communications adapter 290.

In some embodiments, the external transceiver 82 requests pairing with the communications adapter 290 and a message is displayed on a display of the communications adapter 290, an LED is illuminated, or a text to speech message is played and emitted from the audio transducer 25 (e.g., speaker, earbuds, headphone). The message requests that the driver 12 of the target vehicle 10 agree to communicate (e.g., with the law-enforcement personnel 57). After approval by the driver 12 of the target vehicle 10, limited communications between the communications adapter 290 within the target vehicle 10 and the external transceiver 82 is established. An example of such approval is for the driver 12 to press a button on the communications adapter 290 or makes a specific utterance such as "agree" or "yes."

Figure 5:
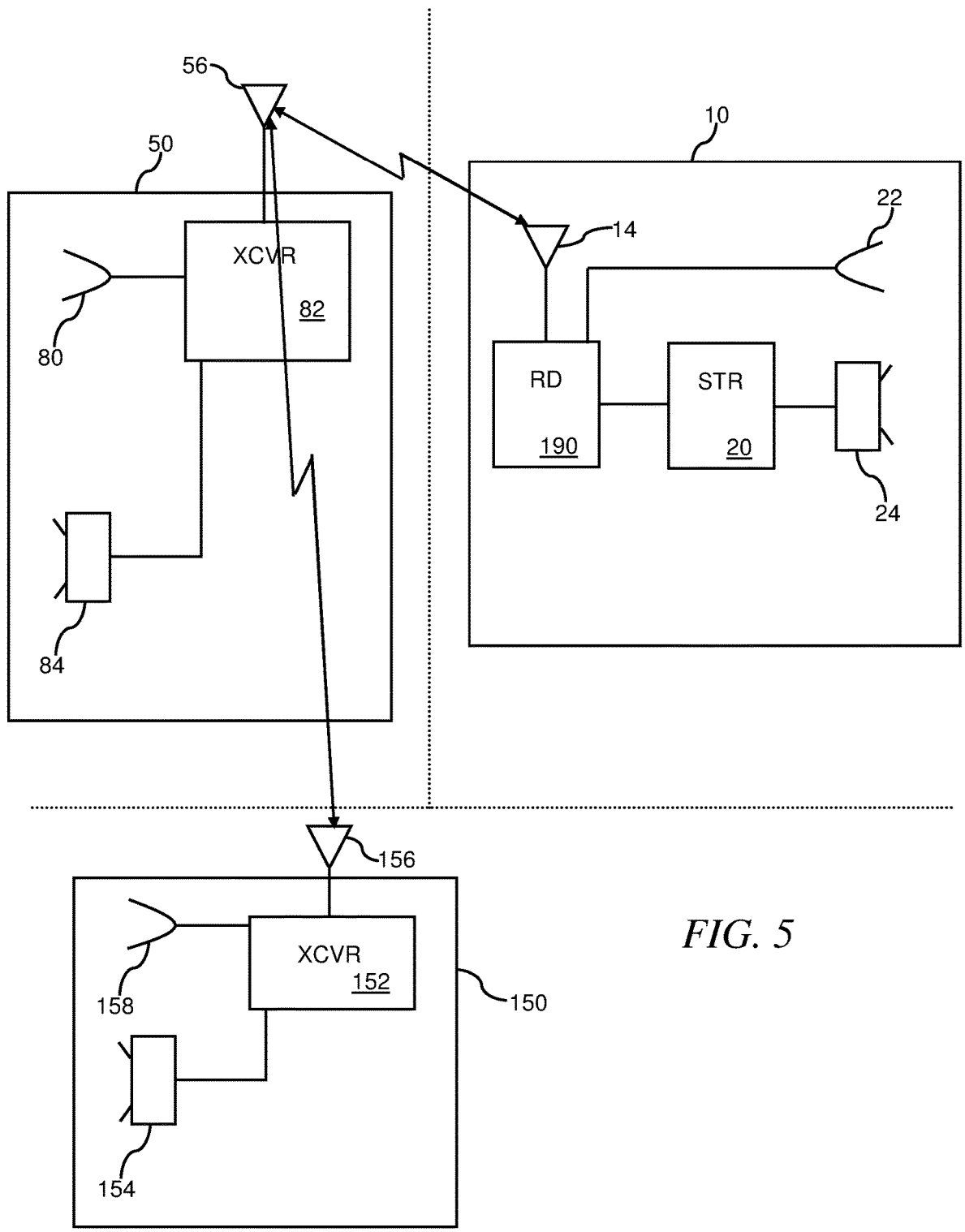
FIG. 5 illustrates a schematic view of the system for communicating with an occupant of a vehicle.

For certain uses, for example a traffic stop, it is beneficial for the law-enforcement personnel 57 to remain in communications with the driver 12 of the target vehicle 10 after the officer exits the law-enforcement vehicle 50. To allow such communications, the law-enforcement personnel 57 is provides with a portable transceiver device 150 as shown in FIG. 5 for use within or outside of the law-enforcement vehicle 50. Although it is anticipated that the portable transceiver device 150 be similar to an earbud (as shown in FIG. 1), there is no limitation as to the physical embodiment of the portable transceiver device 150, as other embodiments are anticipated including, but not limited to, a uniform-worn embodiment.

One exemplary embodiment of the portable transceiver device 150 is shown in FIG. 5. The portable transceiver device 150 has a transceiver 152 that receives an encoded audio signal on an antenna 156, detects, decodes and/or demodulates the encoded audio signal and reproduces the audio signal on a transducer 158 (e.g., an earbud, speaker, etc.). When the law-enforcement personnel 57 speak, the speech is received by a microphone 154 that is interfaced to the transceiver 152. The transceiver 152 encodes and modulates the audio signal from the microphone 154 and transmits an encoded audio signal from the antenna 156. This encoded audio signal is received on the antenna 56 of the law-enforcement vehicle 50, decoded by the external transceiver 82 and then retransmitted or forwarded to the transceiver 190 of the target vehicle 10 where the encoded audio signal is decoded and reproduced on the transducer 24 (e.g., speaker, earbuds, headphone) as described above.

In an alternate law-enforcement embodiment, the external transceiver 82 associated with the law-enforcement vehicle 50 along with audio transducer 84 (e.g. speaker, earbud) and microphone 80 are portable and handheld or worn by the law-enforcement personnel 57, thereby eliminating the need for a separate portable transceiver device 150.

Figure 4A:
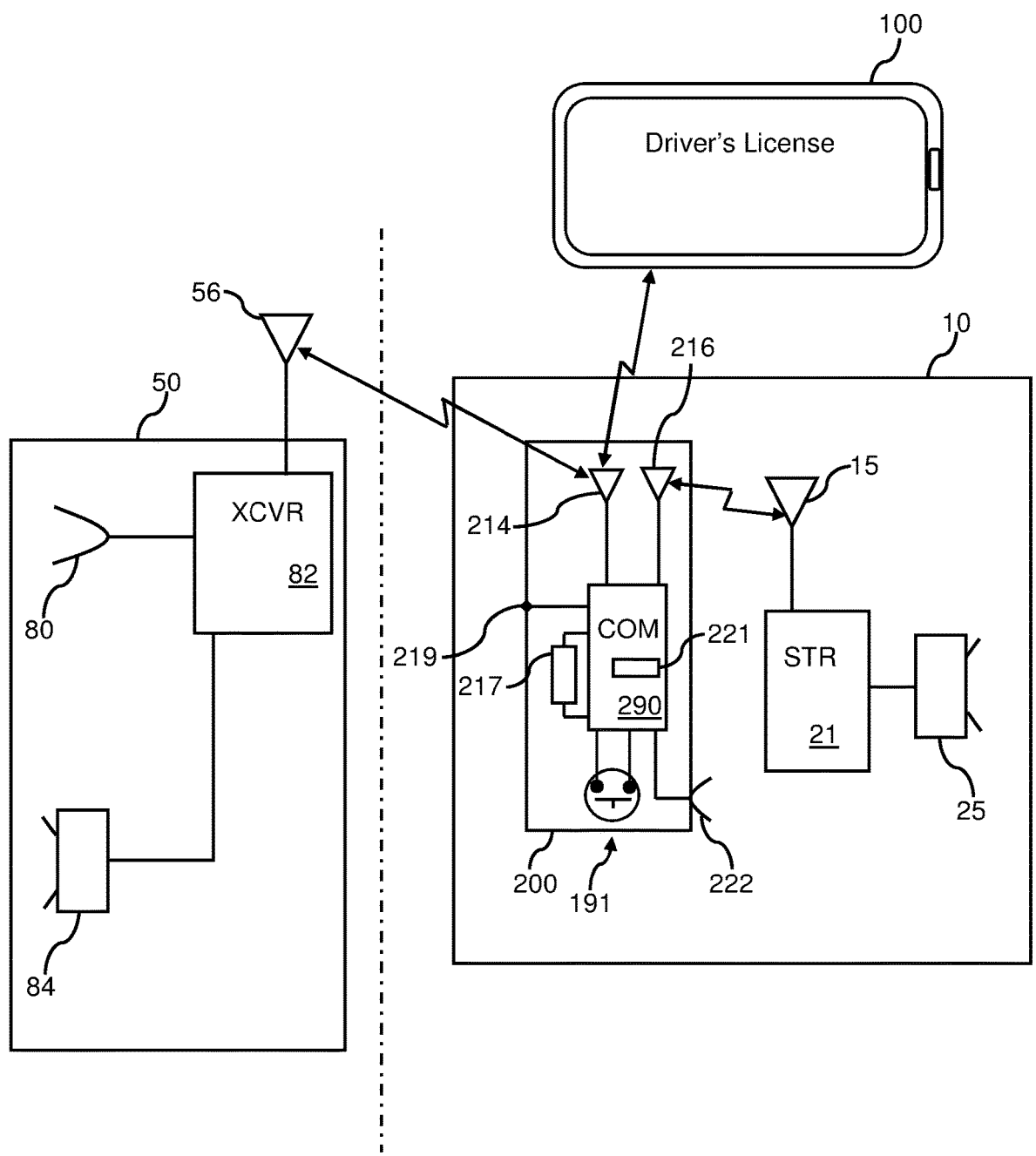
FIG. 4A illustrates a schematic view of the system for communicating with an occupant of a vehicle.

Referring to FIG. 4A, a schematic view of the system for communicating with a driver 12 of a target vehicle 10 will be described. For many older-model vehicles, there are no wireless data communication facilities such as Bluetooth and Wi-Fi. For such vehicles, a stand-alone device 200 is provided for installation within the target vehicle 10.

As in the prior example, a microphone 80 and audio transducer 84 (e.g., speaker, earbuds, headphone) are connected to an external transceiver 82 (e.g. a transceiver external to the target vehicle 10—for example associated with a law-enforcement vehicle 50). The external transceiver 82 encodes the audio signal from the microphone 80 into the transmission protocol (e.g., Bluetooth or Wi-Fi) and emits the encoded signal from an antenna 56. In this embodiment, the car radio 21 of the target vehicle 10 is not able to directly communicate with the external transceiver 82.

To provide such communications, a stand-alone device 200 is provided for mounting within the target vehicle 10 (e.g. by suction to a window, to a sun visor). The stand-alone device 200 includes a communications adapter 290 (as describe above) that receives the signal encoded with audio from the external transceiver 82 on a first antenna 214 and decodes the audio signal from the signal encoded with audio. The communications adapter 290 then modulates the decoded audio signal onto a radio-band using amplitude modulation or frequency modulation (e.g., AM or FM) and emits the modulated audio signal on a second antenna 216.

The existing radio 21 within the target vehicle 10 receives the modulated audio signal on an antenna 15, demodulates and amplifies the audio signal and emits the audio signal from an audio transducer 25 (e.g., speaker, earbuds, headphone). Note, it is anticipated that the existing radio 21 is any AM, FM, AM/FM radio either originally installed into the target vehicle 10, after-market installed in to the target vehicle 10, or is a hand-held portable AM, FM, or AM/FM radio, etc.

When the occupant(s), e.g. driver 12 of the target vehicle 10 speaks, their voice is detected by a microphone 222 mounted on the stand-alone device 200 and interfaced to the communications adapter 290. The microphone 222 is electrically coupled to the communications adapter 290 (e.g., Bluetooth or Wi-Fi radio transceiver). The communications adapter 290 encodes/modulates the voice signal from the occupant of the target vehicle 10 according to the protocol (e.g., Bluetooth or Wi-Fi) and transmits the encoded signal from the antenna 214 to the antenna 56 of the external transceiver 82 where the signal is decoded, demodulated, and reproduced as audio at an audio transducer 84 (e.g., speaker, earbuds, headphone). In this way, the law-enforcement personnel 57 or other persons external to the target vehicle 10 hear whatever is being said within the target vehicle 10.

The communications adapter 290 includes specific modifications, if needed, to the protocols (e.g., Bluetooth and/or Wi-Fi) and/or pairing/encryption mechanisms to provide limited connections to the external transceiver 82 and, in some embodiments, without the need to explicitly pair the communications adapter 290 with the external transceiver 82 or to provide security credentials from the external transceiver 82. The limited capabilities provide for reproduction of an encoded audio signal received from an external device (e.g. external transceiver 82) and/or transmission of voices to/from within the target vehicle 10 to an external device (e.g. external transceiver 82). In some embodiments, a secret key is provided to the external transceiver 82 that enables limited communications with the communications adapter 290.

In some embodiments, the external transceiver 82 requests a connection to the communications adapter 290 and a message is displayed on a display of the stand-alone device 200 (e.g. a flashing LED 201—see FIG. 4B) or a text to speech message is transmitted from the communications adapter 290 to the existing radio 21 and emitted from the audio transducer 25 (e.g., speaker, earbuds, headphone). In some embodiments, the message requests that the driver 12 of the target vehicle 10 agree to communicate (e.g., with the law-enforcement personnel 57). In some embodiments, agreement is made by pressing an "accept" button 191 on the stand-alone device 200. In some embodiments, agreement is made by saying a word (e.g. "agree" or "yes") that is received by the microphone 222 and recognized by the communications adapter 290.

After approval by the driver 12 of the target vehicle 10, limited communications between the communications adapter 290 within the target vehicle 10 and the external transceiver 82 is established.

In some embodiments, the stand-alone device 200 includes a battery 217 and a power connector 219 for charging the battery 217 and/or powering the communications adapter 290.

As during a traffic stop, a license, registration, and insurance card is often required, in some embodiments, the communications adapter 290 is preprogrammed with such documents. In one embodiment, the communications adapter 290 is preprogrammed with one or more such documents using a cellphone 100. In such, an image of each document (driver's license is shown as an example) is captured, for example, from a camera (or uploaded/copied) as known in the industry of cellphones 100 and, during configuration of the stand-alone device 200 using an application running on the cellphone 100, one or more documents are downloaded to the communications adapter 290 and stored in a memory 221 of the communications adapter 290. In some embodiments, the tag number of the target vehicle 10 is also entered at the cellphone 100 and transferred and stored in the memory 221 of the communications adapter 290. In some embodiments, an email address or other address of the driver 12 is entered at the cellphone 100 and transferred and stored in the memory 221 of the communications adapter 290. In some embodiments, the email address or address is used by law-enforcement to send a citation or other communications (e.g. thanking the driver for being courteous and using their turn signals). Note that the image of the documents is anticipated to be any type of image, including a camera image (e.g. JPEG), a PDF, a document with text and images, etc.

Note that, in some situations, a single target vehicle 10 is shared between multiple people as, for example, a family. In such, it is also anticipated that multiple driver's licenses are downloaded into the memory 221 of the communications adapter 290. In such, it is anticipated that the cellphone 100 of the family member that is driving the vehicle will be present in the target vehicle 10 during a traffic stop and, by way of communications between the cellphone 100 of that family member and the communications adapter 290, the communications adapter 200 will select a corresponding driver's license from the memory 221 of the communications adapter 290 during the traffic stop. In situations where two or more registered drivers are present along with their cellphones 100, a decision is made, for example, by signal strength or by sending a query from the communications adapter 290 to all cellphone 100 that are present and receiving an acknowledgement from an application running on the cellphone 100 of the driver.

As many vehicles will be equipped with the stand-alone device 200, it may be necessary to uniquely address one specific stand-alone device 200. For example, when a law-enforcement vehicle 50 stops the target vehicle 10, it is not wanted to initiate communications inadvertently with a different nearby vehicle, for example, in traffic. There are many ways to make improve selection of the correct target vehicle 10. For one, if the tag number of the target vehicle 10 is in the memory 221 of the communications adapter 290, the law-enforcement personnel 57 will enter the tag number at the external transceiver 82 (or the tag number is recognized using a camera mounted to the law-enforcement vehicle 50) and the external transceiver 82 will transmit the tag number to the communications adapter 290 and only the communications adapter 290 having stored there in the equivalent tag number will connect with the external transceiver 82. A second way to make improve selection of the correct target vehicle 10 is by use of received signal strength (RSS), as the closest vehicle to the law-enforcement vehicle 50 will indicate the highest receive signal strength (RSS). Other ways to make improve selection of the correct target vehicle 10 include, for example, encoding a color of the vehicle in the memory of the communications adapter 290 and using that as the tag number was used above or having a number encoded into a bar code that is read with a bar code reader.

In embodiments related to drive-through order processing, the external transceiver 82, microphone 80, and speaker/headphone 82 are associated with an establishment such as a fast-food restaurant, restaurant, pharmacy, grocery, etc. When the target vehicle 10 approaches the establishment, the external transceiver 82 of the establishment communicates with the communications adapter 290 of the target vehicle 10 for order processing. Note that it is anticipated that multiple target vehicles 10 will be present at the establishment and, therefore, the external transceiver 82 needs to connect to the correct target vehicle by way of mechanisms stated above such as receive signal strength, tag number, bar code, vehicle color, etc. In some drive-through scenarios, the tag number is used to recall information of the driver 12 such as name, previous order, etc.

Figure 4B:
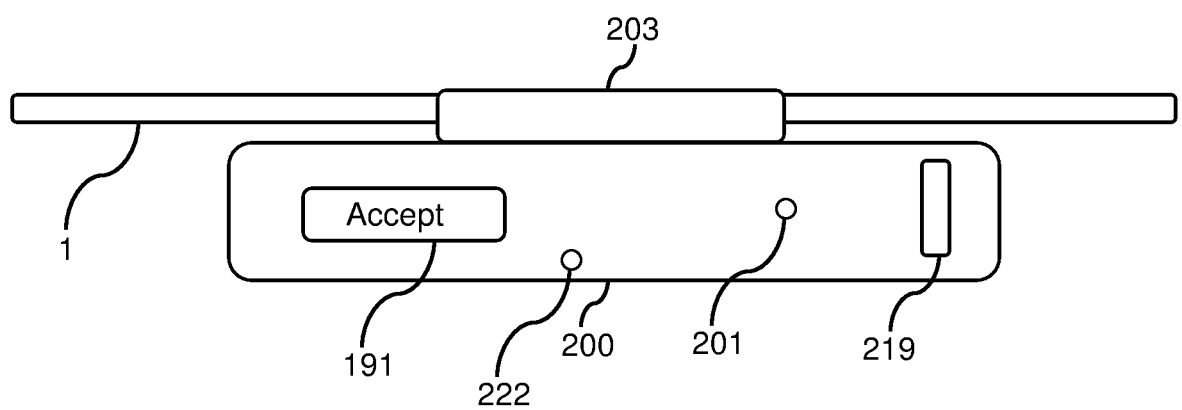
FIG. 4B illustrates a plan view of an embodiment of the system for communicating with an occupant of a vehicle.

In FIG. 4B, an exemplary physical embodiment of the stand-alone device 200 is shown clipped onto a sun visor 1 by a clip 203. In this, the bezel of the stand-alone device 200 includes the accept button 191, an indicator LED 201, and a power connector 219 for charging the internal battery 217. The microphone 222 is mounted behind a small hole to allow audio waves to enter the stand-alone device 200 and reach the microphone 222. Note that this is only shown for example purposes as many other physical and mounting embodiments are anticipates, all of which are included here in.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. An apparatus for communicating with an occupant of a target vehicle comprising:

a stand-alone device within the target vehicle housing a first transceiver and a transmitter, a first microphone is electrically coupled to the first transceiver and the first transceiver receives electrical signals from the first microphone representing audio waves from within the target vehicle, the first transceiver is configured to communicate with an external transceiver over a protocol, the transmitter configured to modulate and transmit a received audio signal to a radio within the target vehicle;

the external transceiver has a second microphone and an audio transducer, the external transceiver attempts to establish a point-to-point connection between the first transceiver and the external transceiver; and when the first transceiver is instructed to accept the point-to-point connection, the external transceiver establishes the point-to-point connection with the first transceiver and the audio waves from within the target vehicle are encoded and transmitted from the first transceiver to the external transceiver and the external transceiver decodes the audio waves and emits decoded audio waves using the audio transducer; and second audio waves from the second microphone are encoded by the external transceiver and sent to the first transceiver where the first transceiver decodes the second audio waves and the first transceiver provides the second audio waves to the transmitter and the transmitter modulates and transmits the second audio waves to the radio within the target vehicle where the second audio waves are demodulated and reproduced by an second audio transducer for hearing within the target vehicle;

wherein the first transceiver has a memory and one or more items are stored within the memory, the items selected from the group consisting of an image of a driver's license, an image of a vehicle registration, an image of a proof-of-insurance card, a vehicle tag number, and an email address.

2. The apparatus of claim 1, wherein the protocol is 802.15.

3. The apparatus of claim 1, wherein the protocol is 802.11.

4. The apparatus of claim 1, wherein one or more of the items are downloaded to the memory from an external device.

5. The apparatus of claim 1, wherein after the external transceiver establishes the point-to-point connection with the first transceiver, the external transceiver is able to request and receive one or more of the items over the protocol.

6. The apparatus of claim 1, wherein before the external transceiver establishes the point-to-point connection with the first transceiver, the external transceiver transmits identifying information to the first transceiver and if the identifying information matches one of the items, the first transceiver accepts the point-to-point connection and the external transceiver establishes the point-to-point connection with the first transceiver.

7. The apparatus of claim 6, wherein the identifying information includes the vehicle tag number of the target vehicle.

8. A method of communicating with a person within a target vehicle, the method comprising:
   using a protocol, establishing a point-to-point connection between an external transceiver and a transceiver within a communication device of a stand-alone device situated in the target vehicle;
   after receiving an approval for voice communications, the transceiver within the communication device of the stand-alone device encoding an audio signal from a microphone interfaced to the stand-alone device into an encoded audio signal and sending the encoded audio signal to the external transceiver using the protocol; and after receiving the approval for voice communications, the external transceiver encoding a second audio signal from a second microphone that is electrically interfaced to the external transceiver into a second encoded audio signal and the external transceiver sending the second encoded audio signal to the transceiver within the communication device of the stand-alone device using the protocol;
   receiving the encoded audio signal by the external transceiver;
   decoding the encoded audio signal back into the audio signal by the external transceiver and converting the audio signal into sound waves by an audio transducer that is electrically interfaced to the external transceiver;
   receiving the second encoded audio signal by the transceiver within the communication device of the stand-alone device and decoding the second encoded audio signal into the second audio signal; and
   after receiving the approval for voice communications, the transceiver within the communication device of the stand-alone device transmitting at least one item from a memory of the communication device to the external transceiver using the protocol;
   wherein the at least one item is selected from the group consisting of an image of a driver's license, an image of a vehicle registration, a vehicle tag number, and an address.

9. The method of claim 8, further comprising after decoding the encoded audio signal back into the audio signal, modulating and transmitting the audio signal from a transmitter of the stand-alone device to a radio within the target vehicle.

10. The method of claim 8, further comprising after decoding the encoded audio signal back into the audio signal, emitting the audio signal from a second transducer, the second transducer electrically interfaced to the stand-alone device.

11. The method of claim 8, wherein the step of receiving the approval comprises pressing of a button on the stand-alone device.

12. The method of claim 8, wherein the step of receiving the approval comprises making an utterance, the utterance received by the microphone interfaced to the stand-alone device and the utterance detected by the communication device of the stand-alone device.

13. An apparatus for law-enforcement communications comprising:
   a stand-alone device within a target vehicle housing a first transceiver and a transmitter, a first microphone is electrically coupled to the first transceiver and the first transceiver receives electrical signals from the first microphone representing audio waves from within the target vehicle, the first transceiver is configured to communicate with an external transceiver over a protocol, the external transceiver interfaced to a law-enforcement vehicle, the transmitter configured to modulate and transmit a received audio signal to a radio within the target vehicle;
   the external transceiver has a second microphone and an audio transducer, the external transceiver attempts to establish a point-to-point connection between the first transceiver and the external transceiver; and
   when the first transceiver is instructed to accept the point-to-point connection, the external transceiver establishes the point-to-point connection with the first transceiver and the audio waves from within the target vehicle are encoded and transmitted from the first transceiver to the external transceiver and the external transceiver decodes the audio waves and emits decoded audio waves using the audio transducer; and second audio waves from the second microphone are encoded by the external transceiver and sent to the first transceiver where the first transceiver decodes the second audio waves and the first transceiver provides the second audio waves to the transmitter and the transmitter modulates and transmits the second audio waves to the radio within the target vehicle where the second audio waves are demodulated and reproduced by an second audio transducer for hearing within the target vehicle;
   wherein the first transceiver has a memory and one or more items are stored within the memory, the items selected from the group consisting of an image of a driver's license, an image of a vehicle registration, an image of a proof-of-insurance card, a vehicle tag number, a physical home address, and an email address.

14. The apparatus of claim 13, wherein after the external transceiver of the law-enforcement vehicle establishes the point-to-point connection with the first transceiver, the external transceiver is enabled to request one or more of the items over the protocol and responsive to the request, the first transceiver encodes and transmits the one or more of the items and the external transceiver receives the one or more of the items for storage or display within the law-enforcement vehicle.

15. The apparatus of claim 13, wherein before the external transceiver establishes the point-to-point connection with the first transceiver, the external transceiver transmits identifying information to the first transceiver and if the identifying information matches one of the items, the first transceiver accepts the point-to-point connection and the external transceiver establishes the point-to-point connection with the first transceiver.

16. The apparatus of claim 15, wherein the identifying information includes the vehicle tag number of the target vehicle.

\* \* \* \* \*